Oct. 26, 1926. 1,604,563
L. J. BROWN
HAND BRAKE FOR RAILWAY CARS
Filed May 2, 1925 2 Sheets-Sheet 1

Inventor
Lloyd J. Brown
By
Attorney

Oct. 26, 1926.
L. J. BROWN
1,604,563
HAND BRAKE FOR RAILWAY CARS
Filed May 2, 1925
2 Sheets-Sheet 2
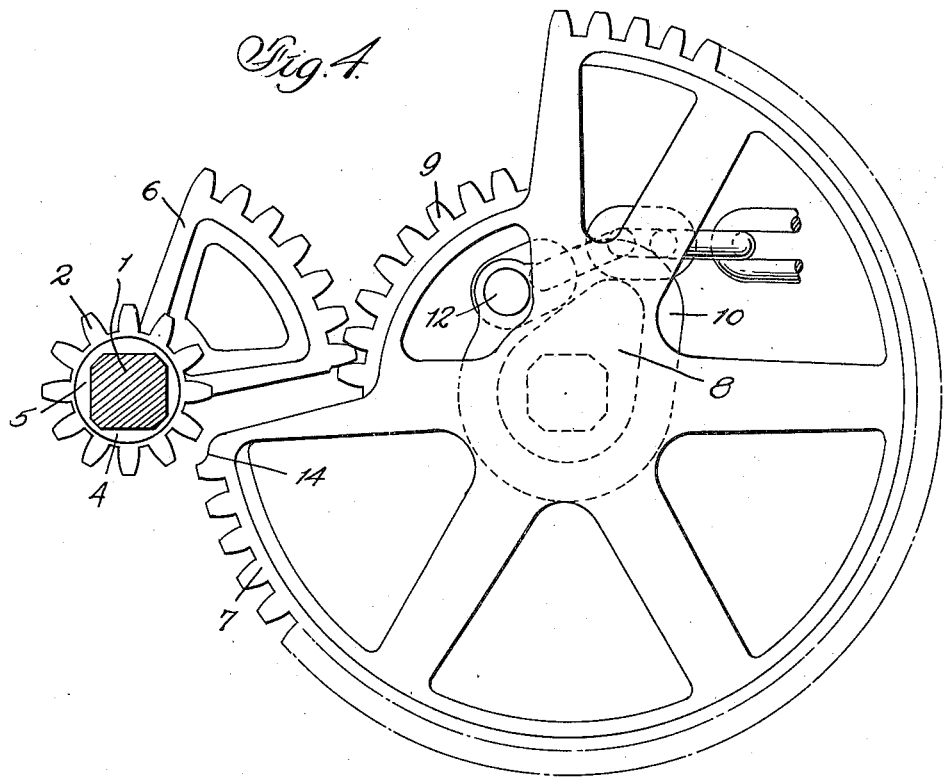
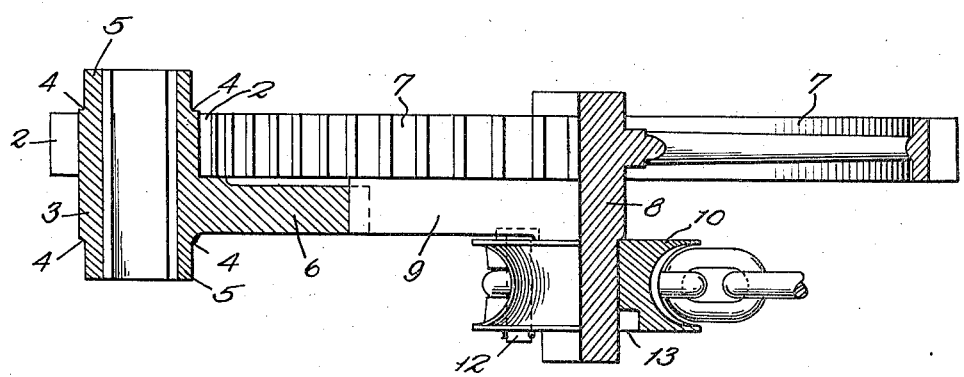
Inventor
Lloyd J. Brown
By
Attorney Patented Oct. 26, 1926.

1,604,563

UNITED STATES PATENT OFFICE.

LLOYD J. BROWN, OF EVANSTON, ILLINOIS, ASSIGNOR TO E. PAYSON SMITH, OF SPRINGFIELD, ILLINOIS.

HAND BRAKE FOR RAILWAY CARS.

Application filed May 2, 1925. Serial No. 27,487.

A ruling by the American Railway Association which is effective March 1, 1925, requires that new freight cars or cars rebuilt after March 1, 1925, shall have hand brake arrangements as follows with respect to braking power; the hand brake wheel, or hand brake ratchet levers, brake staff at chain, and the hand brake levers between the brake staff and cylinder shall be so proportioned that a force of 125 pounds at the rim of the brake wheel, or three inches from the outer end of the hand brake ratchet lever will develop an equivalent load at the brake cylinder piston of not less than 2500 pounds and 3950 pounds, respectively, for cars having eight inch and ten inch cylinders.

The object of my invention is to amplify the power applied at the hand wheel, or ratchet lever, by the trainman, equivalent to the power of the air brake and at the same time to afford a means of taking up the slack in the brake rigging and chain quickly without a sacrifice of power when needed, and to provide a quick release.

Theoretically the power transmitted by my improved gear mechanism is double that required in order to compensate for the large percentage of loss of power due to friction and other causes before its output.

Another object of my invention is to take up quickly and immediately the slack in the brake chain, after which the ratio is reversed and the power is increased so that it is constantly equivalent to the pressure of the lever at the air brake cylinder with air pressure or a minimum of 3950 pounds, so that the car can be gotten under control in a short distance and keep it under control and stop it at the required location.

A further object of my invention is to provide an intermittent segmental gearing which permits of change from 1 to 1 ratio to a 5 to 1 ratio, or other effective ratio.

My invention consists in a gear train of three component parts; first: one full circle pinion gear and an integral quarter circle segmental gear on a lower plane than the pinion; second: a three quarter circle segment gear of a diameter five times that of said pinion, and a one quarter circle segment gear in a plane below the three quarter circle gear; third: a substantially oval shaped brake chain spool connected with the three quarter circle gear; and my invention consists of the parts and combination of parts as will be hereinafter set out.

In the drawings:

Figure 4 is a top plan view of my improved hand brake gearing, the housing being removed.

Figure 5 is a partial sectional view and edge elevation looking from the bottom of Figure 4 upward.

Figure 2:
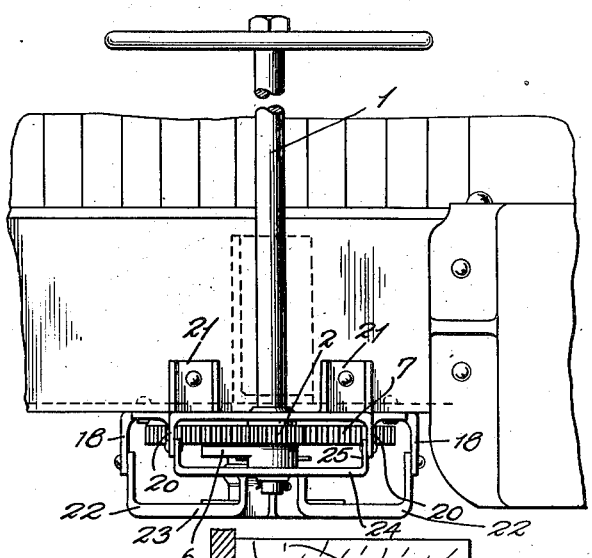
Figure 2 is an end elevation of Figure 1.
Figure 3:
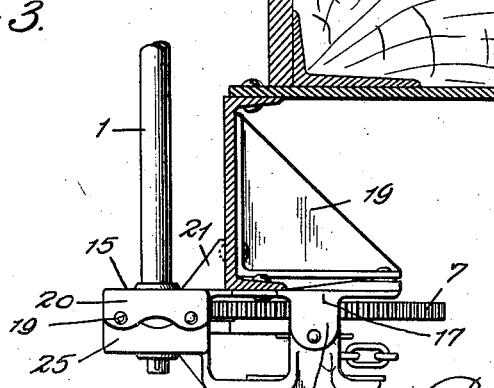
Figure 3 is a vertical section of Figure 2 showing my invention in elevation.

The reference numeral 1 designates the usual brake staff, or ratchet lever of any approved type to which is keyed or otherwise secured, the pinion 2. This pinion is provided with an elongated hub 3 into which the brake staff fits. This hub is provided with shoulders 4 and extensions 5 which are adapted to be engaged by the housing plates for the gearing. A segmental gear 6, of approximately one quarter circle, is formed integrally with the pinion 2 and a hub 3, but in a lower plane than the pinion as clearly shown in Figure 2.

The gear 7 is a segmental or interrupted gear of about three quarter circle and of a diameter five times that of the diameter of the pinion 2. This gear 7 has a hub or shaft 8. A quarter circle segment gear 9 is integrally formed with the gear 7 and hub 8, but in a lower plane than the gear 8 and when in assembled position in line with and adapted to engage the quarter segment 6, as shown in the drawings. This segment gear 9 is positioned in the zone of the interruption of gear 7 as clearly shown in Figure 1.

The lower end of the hub or shaft 8 is squared to which is suitably secured a substantially oval shaped brake chain spool 10, to which the chain 11 is secured in any suitable manner, as for instance, by the pin 12. The under face of the chain spool is recessed, as at 13, to clear the embossing on a suitable housing plate. The chain spool, as will be seen, is mounted off center. The oval shape facilitates the quick take up of the chain and relieves the strain on the chain fastening pin 12. The periphery of the chain spool 10 face being equal to 15″ at the center line of the chain.

The segmental gears 6 and 9 are of the same diameter.

The extended ends 13 of the hub 8 of the gear 7 functions as bearings.

Figure 1:
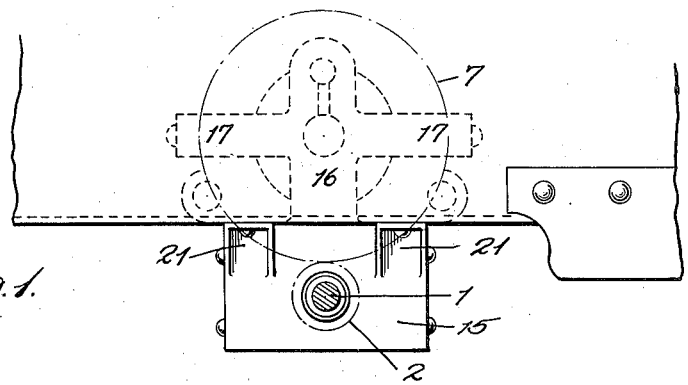
Figure 1 is a top plan view of my improved brake attached to a car.

At the starting position shown in Figure 1 the segmental gear 6 and segmental gear 9 are in mesh. The teeth of these segments remain in mesh until the usual slack in brake chain and rigging has been taken up, when and at which time a larger segmental gear 7, which is cast integral to and on a plane above segmental gear 9 comes into mesh with a small pinion gear 2 which is cast integral to and on a plane above segmental gear 6.

Segmental gear 6 and segmental gear 9 are quarter segments on a plane below the power gears 7 and 2. These segmental gears 6 and 9 have a ratio of 1 to 1 which ratio causes the quick take up. These segmental gears, 6 and 9, act as intermittant gears, that is when they have accomplished a quarter turn of pinion gear 2 and large segmental gear 7 they go out of mesh and pinion gear 2 and large segmental gear 7 come into mesh and you have a ratio of 5 to 1, due to the intermittent feature.

When the quick take up operation is completed then the large segmental gear 7 comes in mesh with the small pinion gear 2 and the gearing then goes into a condition of maximum power, with a ratio of 5 to 1, which means that full power can be applied at this point of the operation or any succeeding points or as soon as brake shoes are in a taut position against the wheels.

When cars are built new or rebuilt there is from 3½ to 4 inches of slack in the brake chain. This is considered an ideal condition and one that the railroads like to maintain. The quick take up feature of this brake is designed to accomplish this condition or to take up approximately 4 inches of chain and lever slack before going into power. After cars are in service for some months brake shoes wear, brake chain stretches, brake lever rods and all brake connections wear, all of which conditions give more slack in brake chain and brake connections. When this condition occurs there is then more than 4 inches of slack in chain and brake connections which necessitates travel in maximum power condition until all slack is taken up and during which time the gearing or brake develops the maximum power ratio and continues to do so until brakes are in a full set position.

It is a necessary feature that a hand brake shall have a quick release as well as a quick take up, otherwise the brakes would drag or in some cases stick due to time consumed in release.

Action of mechanism: When starting release, the small pinion gear 2 and the large segmental gear 7 being in mesh to accomplish power are in a tense position due to braking power (required by American Railway Association interchange regulations) on brake shoes. When brake ratchet is released this tension will quickly throw the teeth of segmental gear 6 and segmental gear 9 into mesh accomplishing quick release.

It will be noted that segmental gear 6 and segmental gear 9 perform only the function of quick take up and quick release as the power ratio of these gears is extremely low (ratio, 1 to 1).

On the large segmental gear 7 at total release position there is provided an odd sized tooth 14 which acts as a stop and prevents the quick take up and quick release (segmental gear 6 and segmental gear 9) from going out of mesh.

The spool which is attached to the shaft of the large segmental gear is of an odd shape with an off center hole. These features give a quicker take up and more power due to the fact that the larger circumference of the spool is so designed that it corresponds with the quick take up gears. When you pass the large circumference of the spool (⅜ circumference you are down on a spool which has a smaller diameter which is constant for the remaining ⅝ of the circumference of spool and which consequently gives you uniform power, which corresponds with the uniform power transmitted by the pinion gear 2 and large segmental gear 7.

The housing comprises an upper and a lower section. The upper section has a front portion 15 which extends beyond the end of the car and a rear portion 16 which, in the type of car shown, extends under the end sill and has arms 17, the outer ends of which are turned down as at 18, the rear portion being supported by means of a knee iron 19 to which it is riveted, and it in turn is riveted to the end sill. The front portion 15 is provided with depending flanges 20 which with the lower housing member, to be described, prevent the foot and clothing of the operator from damage by said gearing, besides protecting the gearing from the elements, dust and cinders. Fastening members 21 extending from the housing member 15 are adapted to be secured to the car structure to hold the housing in place.

The lower housing member 23 has two bearing points, one for the brake staff 1 and the other for the shaft 8. This lower housing section has lugs 22 which are secured to the lugs 18 of the upper section, the forward portion 24 of the lower section having lugs 25 which are secured to the lugs 20 of the upper housing section. These bearings extend upward in the housing so that the shafts 8 and 3 ride upon them, and act as supporting members to prevent tipping or fouling of the gears when power is applied.

Top section of housing has two bearings. The brake shaft passes through the bearing for pinion gear 2 and the upper part of the shaft which carries large segmental gear 7 passes through the other bearing point. These bearing points extend downward and rest on the hub of their respective gears and act as auxiliary supporting members to prevent tipping and fouling of gears when power is applied to mechanism.

Across the top of upper section of housing, lugs 21 are provided for attachment to car 16. These lugs also prevent brake from tipping when power is applied, which tipping would cause binding action affecting the operating efficiency of the mechanism. For hopper cars the lugs 21 would be attached to the lower section of the housing.

I am aware that changes may be made in the construction of the parts and relative arrangement of parts without departing from the scope of the appended claim.

What I claim is:

In a car hand brake, the combination with the brake staff, a pinion on said staff, and a segment gear integral with said pinion but in a lower plane, of a comparatively large interrupted gear wheel, a relatively small segmental gear positioned in the zone of interruption of the larger gear and in a lower plane than the larger gear, and adapted to engage the first named segmental gear, a substantially oval shaped brake chain spool secured to the shaft of the larger gear, and a stop on the larger gear to prevent the said segmental gears from going out of mesh.

In testimony whereof I affix my signature.

LLOYD J. BROWN.